Patented Apr. 26, 1932

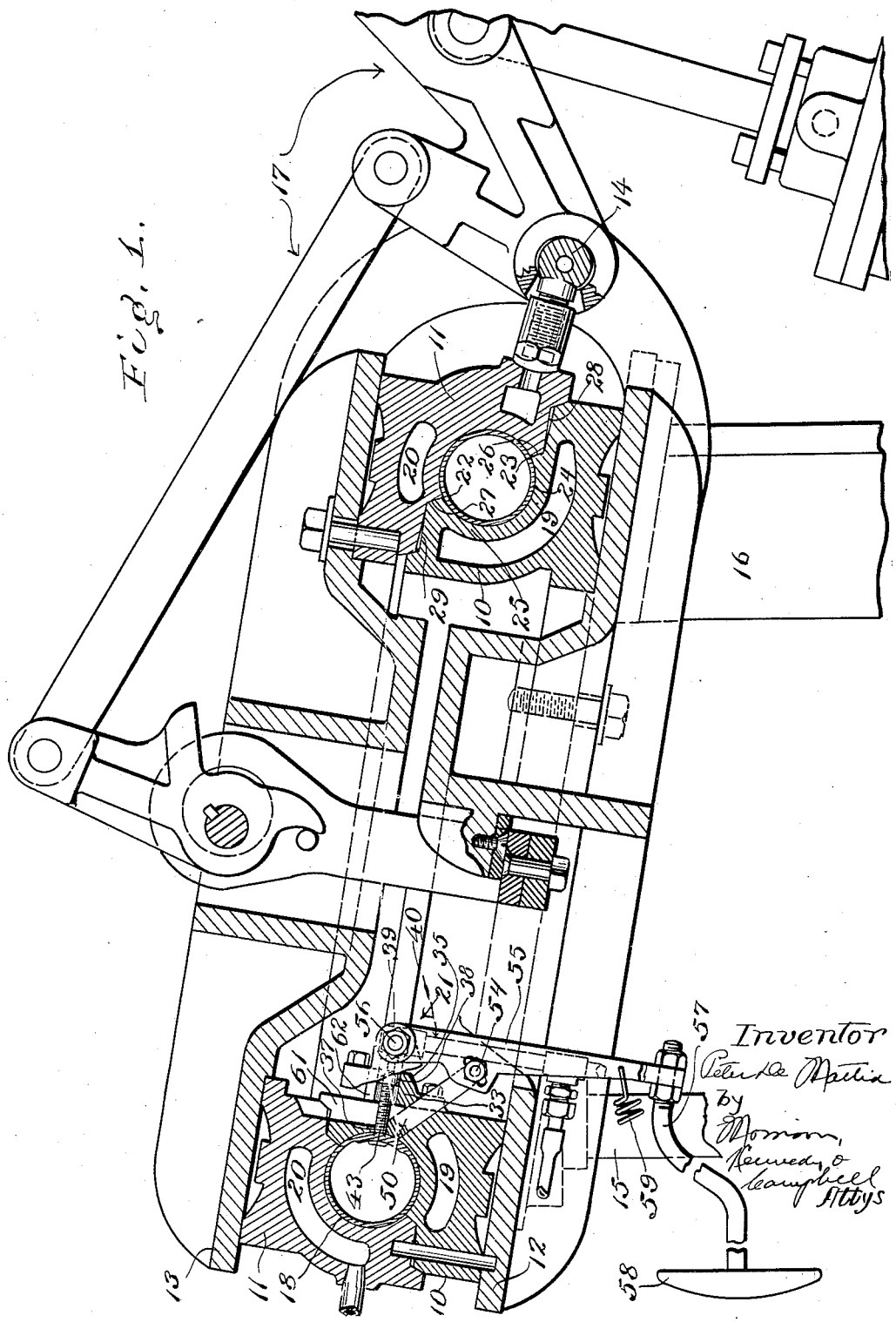

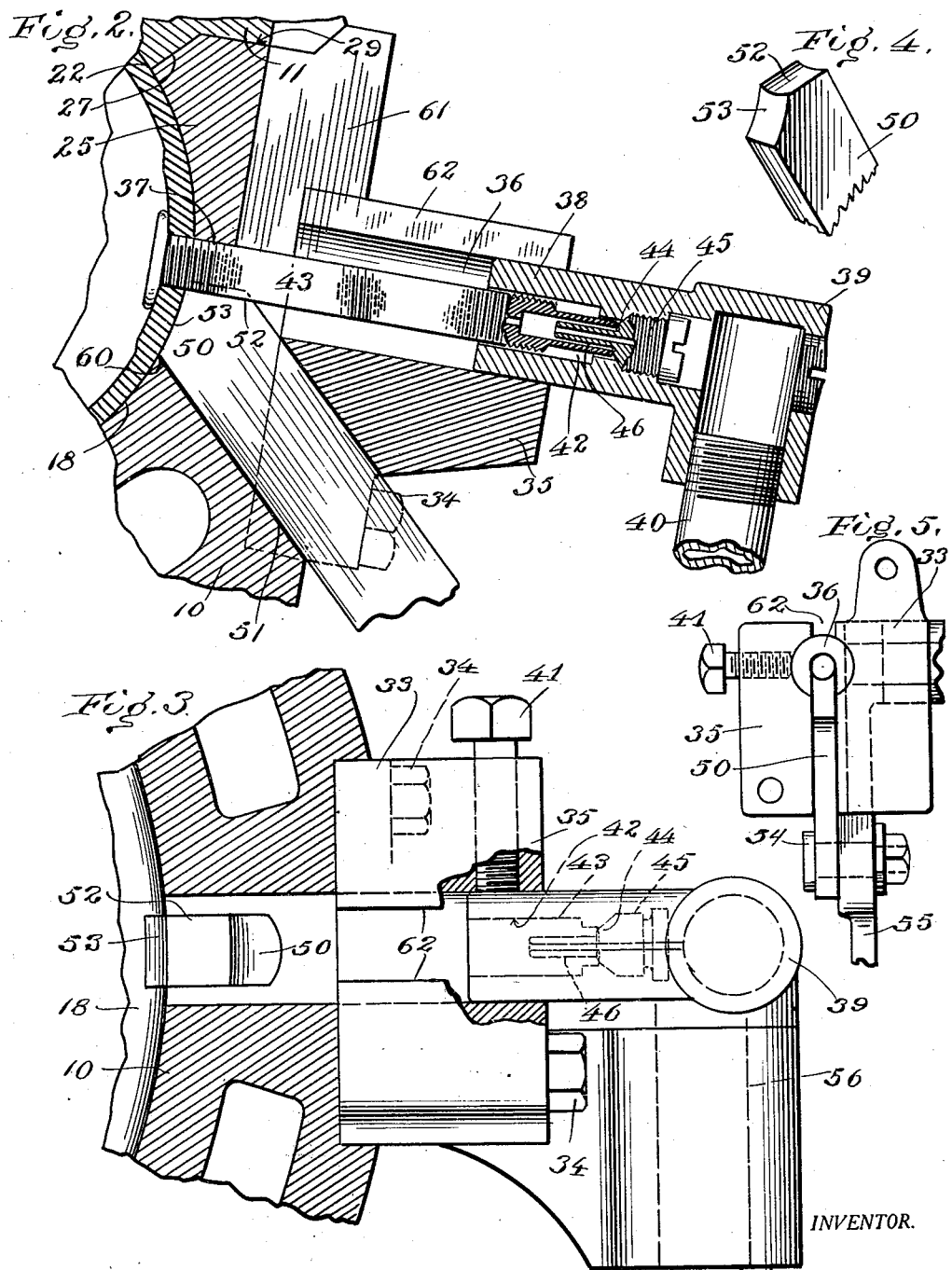

1,855,753

UNITED STATES PATENT OFFICE

PETER DE MATTIA, OF PASSAIC, NEW JERSEY, ASSIGNOR TO NATIONAL RUBBER MACHINERY COMPANY, A CORPORATION OF OHIO

VULCANIZING MOLD FOR INNER TUBES AND THE LIKE

Original application filed August 29, 1928, Serial No. 302,710. Divided and this application filed June 23, 1930. Serial No. 463,099.

This invention relates to improvements in vulcanizing apparatus, and refers particularly to means for supplying air or other inflating pressure fluid to inflatable articles, such as inner tubes and the like, while they are being vulcanized in molds or presses.

In one method of producing inner tubes, vulcanization is carried out in steam jacketed molds while the tubes are inflated with air or other fluid under pressure. The tubes are provided with valve stems through which they are inflated and deflated, and in connecting these valve stems with the fluid supply conduits, screw-threaded couplings or unions are ordinarily employed. These old types of connections have given rise to objections in that they require considerable time in being made and broken, and moreover they frequently result in the uneven curing of the tubes as well as in the slowing up of production. Recent advances in the art have reduced the time necessary for vulcanizing inner tubes, and it has become more imperative than ever that the vulcanizers be capable of quick loading and unloading to avoid the foregoing and other objections.

With this object in view, the present invention provides an air pipe coupling in which a fluid-tight joint will automatically be established between the valve stem and the coupling as the unvulcanized tube is positioned in the mold cavity. More specifically, the invention contemplates a coupling which is mounted in fixed relation to the mold and which has a socket for receiving the end of the valve stem as the latter is shoved through the customary hole or aperture formed in the inner wall of the mold cavity. At the bottom of this socket, there is a fluid-conducting member which is engaged by the abutting end of the valve stem, forming a fluid-tight joint, and the valve stem is locked in position by a clamping member mounted on the fixed mold section. Preferably, the coupling includes telescopic members which are relatively adjustable to compensate for variations in length of different valve stems.

Another feature of the invention is the provision of air pipe connecting means adapted particularly for use in or with a sectional vulcanizing mold whose parting lines are offset from the central circumferential plane of the mold, so as to leave intact the inner or base wall which contains the receiving aperture for the valve stem. To this end, the clamping member previously alluded to is formed as a sliding bar arranged in the mold wall and at an angle to the axis of the valve stem receiving aperture. The guideway for this sliding bar intersects said valve stem receiving aperture as well as the mold cavity, and the inner end of the bar is so formed that one portion of it clampingly engages against the valve stem, and another portion fills up the cutaway portion of the mold cavity wall. This arrangement is particularly advantageous in that it facilitates insertion of bent valve stems as well as straight ones.

The invention is disclosed in my pending application for Letters Patent for vulcanizing mold for inner tubes and the like, Serial No. 302,710, filed Aug. 29, 1928, of which the present application is a division.

The foregoing and other objects, features, and advantages of the invention will be fully appreciated from the following description in connection with the accompanying drawings, wherein one embodiment of the invention has been shown by way of illustration, and wherein Figure 1 is a vertical longitudinal sectional view through a vulcanizing press equipped with an air pipe connection made in accordance with the invention;

Fig. 2 is a fragmentary longitudinal sectional view through the apparatus on a larger scale;

Fig. 3 is a top plan view thereof with parts broken away and parts in section;

Fig. 4 is a detail perspective view of the valve stem clamping member; and

Fig. 5 is an inner end view of the coupling and clamping means disconnected from the mold.

Although the invention is adapted for use in other types of apparatus, it has herein been illustrated specifically as applied to a tube vulcanizing press wherein a pair of opposed mold sections 10 and 11 are respectively attached to platens 12 and 13, hingedly connected together at 14, the lower platen 12 being supported in fixed position by means of suitable standards 15 and 16, and the upper platen 13 being movable toward and from the fixed platen by means of a suitable power mechanism 17, all as more fully described in copending application Serial No. 271,695, filed April 21, 1928. The meeting faces of the mold sections 10 and 11 are provided with grooves which, when the press is closed, define a continuous annular mold cavity 18 within which an inner tube or the like is adapted to be confined for vulcanization. Heat is supplied by the circulation of steam or other heating medium through jackets or chambers 19 and 20 which surround the cavity 18 in the usual manner, and pressure is applied to the confined rubber tube by inflating it through the novel connecting means later to be described.

As clearly shown in Fig. 1, the mold cavity 18 is equally divided between the two mold sections 10 and 11, the parting lines of which, at the inner and outer peripheries, intersect the mold cavity at diametrically opposite points 22 and 23, respectively, located on opposite sides of, and of course at equal distances from, the central circumferential plane of the mold. In other words, said parting lines intersect the cavity 18 circumferentially in such a manner as to define a truncated cone whose sides pass diagonally through the center of the mold cavity and whose apex is located in the direction of the opening movement of the movable section 11 as it is carried upwardly by the platen 13. With this arrangement, it will be observed that the lower mold section 10 presents a side wall 24 to engage the green or unvulcanized tube throughout the major portion of its radial extent, and an overhanging inner wall 25 to engage the tube throughout its base or the major portion of its axial extent. The meeting faces of the two mold sections extend obliquely from the points 22 and 23 as indicated at 26 and 27 (Fig. 1), and thence are offset in planes 28 and 29, located at opposite sides of, but parallel to, the central circumferential plane. The beveled or inclined portions 26 and 27 form a tapered bore fit serving to accurately register the mold sections when in closed relation, and thus provide a fluid-tight joint to prevent the formation of rinds or fins on the vulcanized tube, the flat or parallel portions at 28 and 29 being slightly spaced apart to provide the necessary clearance. This specific type of mold forms the subject of copending application Serial No. 263,623, filed March 22, 1928, to which reference may be had for further particulars.

Coming now to the present invention, it will be seen that the novel connecting means 21 is associated with the lower or fixed mold section 10 and is in the nature of a socket or coupling connected to the air supply pipe and mounted in fixed position to receive the inserted end of a valve stem. The socket or coupling comprises a bracket 33 secured to the inner side of the mold section 10 as by bolts 34 and provided with a boss 35 having a longitudinal bore 36 in axial alinement with a valve stem opening 37 in the mold wall 25. This bore 36 is of sufficient diameter to snugly receive one end 38 of an L-shaped fitting or gun 39, the other end of which is secured to an air supply pipe 40. The gun 39 is adjustable toward and from the mold wall and is clamped in its adjusted position by a set screw 41, such adjustment being provided in order to accommodate valve stems of different lengths. The outer end 38 of the air gun is counterbored to provide a socket 42 for the reception of the end of a valve stem 43, the reduced extremity of which, as best shown in Fig. 2, is adapted to abut against a knife-edged annular shoulder 44 on a nipple 45 screwed into the bottom of the socket 42. The nipple 45 also has a reduced extremity 46 which is adapted to extend into the end of the valve stem to guide it to its seat against the shoulder 44 and to direct the inflating air into it.

For the purpose of firmly holding the valve stem 43 during the vulcanizing operation, novel locking means are provided as will now be explained. A locking bar 50 is slidably arranged in an opening 51 extending diagonally through the mold wall and intersecting the valve stem opening 37. The inner end of the bar 50 (see Fig. 4) is formed with a curved surface 52 adapted to engage the lower side of the valve stem, and another curved surface 53 which is flush with the surface of the mold cavity when the bar is in its locking position. The outer end of the bar 50 is pivotally connected at 54 to a lever 55, which, in turn, is pivoted at 56 to the bracket 33. The lever 55 preferably extends downwardly from the bracket 33 and is provided, at its lower end, with a forwardly extending push rod 57 having a pad 58 on its extremity whereby it may be rocked to unlocking position by manual pressure. A tension spring 59 acts upon the lever 55 to normally maintain the bar 50 in its locking position, and thus the valve stem will be firmly held during the vulcanizing operations.

In using this form of the invention, the gun 39 is first adjusted to its proper position to accommodate valve stems of a certain length, and it is locked in such position by the screw 41. Then while the mold is open, the attendant places an unvulcanized tire in the cavity of the fixed mold section, pushing the valve stem 43 through the opening 37 and to its seat against the knife-edged shoulder 44 of the nipple 45. Pressure, which has in the meantime been applied to the pad 58 to retract the bar 50, is then released, whereupon the spring 59 draws the lever 55 forwardly to effect the clamping of the valve stem by engagement with the upper end of the bar 50. The closing of the press, inflation of the tube, and subsequent opening of the press may then be carried out either manually or automatically as desired. Thus, the operations of loading and unloading the vulcanizing unit can be very quickly performed because the connections between the valve stem and air supply are automatically made and broken as the tubes are successively inserted and removed. The invention is extremely simple in construction, capable of being economically produced, and constitutes a substantial advance in the art.

The use of the clamping bar 50 in the illustrated embodiment also permits the vulcanization of inner tubes with bent or crooked valve stems. In other words, when the bar 50 is withdrawn in the manner described, it leaves an opening 60 through the mold wall 25 which communicates with a vertical opening or slot 61 also cut through the mold wall, these two openings in conjunction with a slot 62 formed in the upper side of the bracket 33 permitting the insertion of the bent valve stem, and the bar 50, when released, acting to clamp said valve stem in place. In this instance, the old type of air connection may be used for cooperation with the bent valve stem if desired.

Obviously the invention is susceptible of numerous modifications in the details of construction and arrangement of parts, and the right is herein reserved to make such changes as fall within the scope of the appended claims without departing from the spirit of the invention.

Having thus described my invention, what I claim is:

1. In or for a vulcanizing mold having an apertured wall for the reception of an inflation valve stem, means for clamping a valve stem in position in the apertured wall, said means comprising a locking bar slidable angularly through the mold wall and into engagement with the valve stem, and means for sliding said locking bar to its locking and unlocking positions.

2. In or for a vulcanizing mold having an apertured wall for the reception of an inflation valve stem, means for clamping a valve stem in position in the apertured wall, said means comprising a locking bar slidable angularly through the mold wall and into engagement with the valve stem, a spring acting to normally maintain the bar in its locking position, and means for retracting the bar against the action of said spring.

3. In combination with a vulcanizing mold having a cavity for confining an inflatable article to be vulcanized and an apertured wall for the reception of an inflation valve stem associated with the inflatable article, valve stem clamping means comprising a bar slidable diagonally through the mold wall, the inner end of said bar having a surface for engaging the side of the valve stem and another surface which, in the locking position, is continuous with the surface of the mold cavity, and means for sliding said bar to its locking and unlocking positions.

4. In combination with a vulcanizing mold having a cavity for confining an inflatable article to be vulcanized and an apertured wall for the reception of an inflation valve stem associated with the inflatable article, valve stem clamping means comprising a bar slidable diagonally through the mold wall, the inner end of said bar having a surface for engaging the side of the valve stem and another surface which, in the locking position, is continuous with the surface of the mold cavity, a lever pivoted to the mold section and connected with the bar whereby rocking movement of the lever will result in sliding the bar to its locking and unlocking positions, and a spring acting on the lever to normally maintain the bar in its locking position.

5. The combination of a vulcanizing mold having an apertured wall for the reception of an inflation valve stem, and a spring pressed bar slidably mounted in said mold and extending into said aperture for yielding engagement with the valve stem therein.

In testimony whereof, this specification has been duly signed by:

PETER DE MATTIA.